July 9, 1963  J. E. STEINER  3,096,937
PROPORTIONING CONDITION CONTROL SYSTEM
Filed Dec. 10, 1958  2 Sheets-Sheet 1

INVENTOR.
JOHN E. STEINER
BY
ATTORNEYS

July 9, 1963    J. E. STEINER    3,096,937
PROPORTIONING CONDITION CONTROL SYSTEM
Filed Dec. 10, 1958    2 Sheets-Sheet 2

INVENTOR.
JOHN E. STEINER
BY
Carlson, Pitzner, Hubbard & Wolf
ATTORNEYS

United States Patent Office
3,096,937
Patented July 9, 1963

3,096,937
PROPORTIONING CONDITION CONTROL SYSTEM
John E. Steiner, Rockford, Ill., assignor to Barber-Colman Company, Rockford, Ill., a corporation of Illinois
Filed Dec. 10, 1958, Ser. No. 779,414
7 Claims. (Cl. 236—78)

This invention relates generally to a system for adjusting one or more condition regulators to correct for deviations of a controlled condition such as temperature from a desired value and thereby maintain the condition at such value. More particularly, the invention relates to a condition control system in which a plurality of regulators are rendered effective in a sequence through individual amplifier-controller units responsive to deviations of the controlled condition and in which at least one regulator is adjusted to provide a so-called proportioning type of control action. With such action, the percentage of adjustment of the regulator is proportional to changes in the controlled condition and the total change in the condition required for the controller to adjust the regulator through its entire range is called the throttling range or proportioning band.

The general object of the invention is to arrange the parts of a control system of the above character in a novel manner enabling the system to be adapted easily for different types of control actions while insuring accuracy and stability in the operation with each type of action.

Another object is to avoid the undesirable effects of stray signals and achieve stability and accuracy in a proportioning type of controller by a novel circuit arrangement enabling both the condition sensing elements and the throttling elements to be maintained at low impedance levels with respect to ground.

A further object is to provide a sequencing system in which the calibration is stabilized by separating the throttling elements of one controller from the sequencing elements and also from the throttling elements of the other controllers.

Still another object is to arrange the sequencing elements in the input circuits of the controllers in a novel manner permitting overlap of the effective ranges of the controllers and insuring stability of the calibration of the system even during adjustment of the controllers.

The invention also resides in the novel arrangement of the condition sensing elements and the sequencing elements enabling the system to be made up of few rugged parts of low cost while maintaining the desired high degree of accuracy.

Other objects and advantages of the invention will become apparent from the following detailed description taken in connection with the accompanying drawings, in which FIGURE 1 is a schematic view and wiring diagram of a temperature control system embodying the novel features of the present invention.

Figure 1:
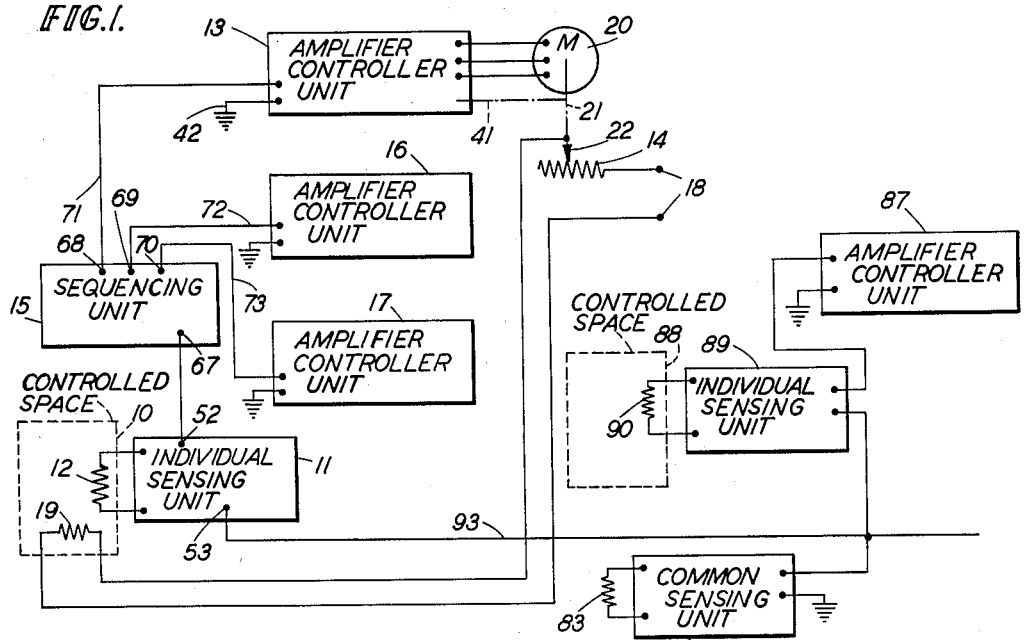

While the present invention is suited for the automatic control of various conditions such as pressure, temperature or flow, it is shown in the drawings for purposes of illustration in a system for controlling the temperature of a space 10. The latter, for example, may be the interior of a dwelling or other building. Changes in the temperature of the controlled space are detected by a sensing unit 11 having a temperature responsive element 12 within the space and providing an output signal variable with changes in the temperature. This signal is applied to an amplifier-controller 13 operating to adjust a condition regulator 14 in the proper direction and amount in response to changes of the controlled condition so as to correct for deviations of the condition from a desired value.

In some condition control systems of the above character, it is desirable to provide more than one condition regulator and to adjust the same individually through separate amplifier-controllers as the controlled temperature reaches different pre-selected values. Such a sequencing system is illustrated generally in FIG. 1 of the drawings with the output signal of the sensing unit 11 applied through a sequence unit 15 to two amplifier-controllers 16 and 17 in addition to the controller 13 for the regulator 14. Other regulators (not shown) are adjusted by the other controllers to change the controlled temperature, such regulators providing either a heating or cooling action as desired.

The regulator 14 is shown for purposes of illustration as a resistor of adjustable value connected across a suitable source 18 of alternating current in series with an electric resistance heating element 19 disposed within the controlled space 10. Adjustment of the value of the resistance and therefore of the heat delivered to the space by the heater is effected by a reversible electric motor 20 through a suitable drive connection 21. The motor operates to shift the slider 22 of the resistor in opposite directions upon energization of one or the other of two relays 23 and 24 connected in output circuits of the controller 13 and having contacts 25 and 26 connected respectively in forward and reverse motor control circuits.

The controllers 13, 16, and 17 may provide different types of control actions such as a proportioning action or an "on-off" action. The latter also is known as a two-position action and involves adjustment of the condition regulator only to its fully "on" or its fully "off" condition. In a proportioning action, the regulator is adjusted throughout its total range in response to variation of the controlled temperature throughout a so-called throttling range or proportioning band. Stated another way, the adjustment of the regulator within its range is proportional to the value of the temperature while the temperature is within the throttling range, the latter being the total change of temperature required to adjust the regulator throughout its range. To obtain the desired proportioning action, a throttling or feedback signal proportional to the adjustment of the regulator is applied to the input of the controller in opposition to the temperature responsive signal. Assuming that all three of the controllers provide a proportioning action in this instance, only the first controller 13 will be described in detail.

The first controller 13 operates to energize one or the other of the relays 23 and 24 depending on the phase and amplitude of an alternating current signal applied to the controller input. This signal varies with the temperature responsive signal and the throttling signal and is applied first to an input circuit of an amplifying device 27 in the controller. This circuit extends between an input electrode 28 of the device and another electrode 29 common to the input circuit and an output circuit. The latter extends between the common electrode and an output electrode 30 and is connected to an input circuit of a second stage amplifier device 31. Herein, both amplifier devices are vacuum tubes whose control grids, cathodes and plates constitute the respective input, common and output electrodes.

From the output circuit of the second amplifier tube 31, the amplified input signal of the controller 13 is applied through individual current limiting resistors 32 to the control grids of two vacuum tubes 33 and 34 of a phase discriminator. The output circuits of these tubes extend from their anodes through the respective coils of the output relays 23 and 24 and opposite halves of a transformer secondary winding 35 to a grounded center tap 36. From ground, the output circuits extend to the cathodes of the tubes through opposite halves of another secondary winding 37. The latter provides bias voltages which are applied to the grids through a resistor 38 and which are out of phase with the voltage applied to the plates so as to reduce the current through the relay coils to a value below the pull-in value of the relay whenever there is no signal from the second amplifier tube 31. A signal of one phase or the other from this tube, however, results in conduction by one or the other tube and energization of the associated relay coil.

The throttling signal for the proportioning action is derived from a potentiometer 39 having a slider 40 driven by the motor 20 through a suitable mechanical connection 41. Such potentiometers usually are located adjacent the motor and remote from both the controller 13 and the sensing unit 11. The long lengths of conductors then required to connect the potentiometer to the controller are subject to the inducement of current therein by stray electrical fields.

To achieve a high degree of accuracy in the system while simplifying the construction thereof, the present invention, in one of its aspects, contemplates connecting the throttling potentiometer 39 and the elements providing the temperature responsive signal to the input circuit of the first amplifier tube 27 in a novel manner enabling the impedances of the potentiometer connections and of the temperature responsive elements both to be kept at a low level relative to ground. With such low impedance, the voltages resulting from currents induced by stray fields in the potentiometer conductors and in the temperature sensing elements are of negligibly low values so as to reduce the possibility of false or error signals. Not only does the low impedance thus contribute to a high degree of accuracy, but it also avoids the necessity of shielding the potentiometer connections. The construction of the system thus is simplified and its cost is reduced.

In accordance with the invention, the input circuit of the controller 13 extending from the grid 28 to the cathode 29 of the first tube 27 is grounded at a point indicated at 42 between the sensing unit 11 and the connection to the throttling potentiometer 39. This connection includes an impedance element 43 of very low value on the order of a few ohms connected directly to ground in the input circuit and to the potentiometer 39 through a conductor 44. Due to the location of the grounded point and the low impedance connections 43, 44, the throttling elements as well as the sensing elements are kept at low impedance levels. To keep the impedance between ground and the cathode of the tube low and thereby reduce negative feedback the throttling impedance element 43 preferably is located in this part of the amplifier input circuit and the temperature sensing unit 11 is located in the other part of the circuit between the grid and ground.

To vary the voltage across the throttling element 43 in accordance with adjustments of the potentiometer slider 40, the potentiometer 39 and the element 43 are parts of a normally balanced network including in this instance the center tapped bias secondary winding 37 connected between the cathodes of the phase discriminator tubes 33 and 34. Opposite ends of this secondary are connected through low resistance protective resistors 45 to the respective end terminals of the potentiometer resistor 46. The slider then is connected to the center tap of the secondary winding 37 through a series resistor 47 located adjacent the slider, the conductor 44, the throttling element 43, and ground 42. With this arrangement of the throttling parts, the voltage across the throttling element varies in phase and amplitude as the potentiometer slider is shifted to one side or the other of the center of the potentiometer resistor 46. The proportion of this throttling element voltage applied between the grid 28 and cathode 29 of the first amplifier tube 27 preferably is made adjustable by utilizing for this element a variable resistor having a slider 48 connected to the cathode through a series resistor 49. By adjusting the position of this slider, the width of the throttling range is varied.

With the resistor 47 located adjacent the slider 40, the impedance level of the conductor 44 is low with respect to ground due to the low value of the throttling element 43. This same low impedance level also is present when the resistor 47 is adjacent the throttling element 43. This is due to the low values of the potentiometer resistance 46, the protective resistances 45, and the halves of the transformer secondary 37 connecting the slider 40 to ground. By virtue of such low impedance level, voltages resulting from currents induced in the conductor 44 due to stray fields are of negligible value so as to introduce practically no error signal into the amplifier input circuit.

The sensing unit 11 is a normally balanced network having at least two sections 50 and 51 providing opposed voltages variable with changes in the impedances of the sections to provide between two output terminals 52 and 53 an alternating current signal variable in phase and amplitude in accordance with unbalance of the opposed voltages. In addition to the condition-sensing element 12 in one section of the network and a balancing impedance element 54 in the other section, the unit includes a voltage source and a variable impedance element 55. The latter is adjustable to vary the calibration of the network and thus compensate for inaccuracies in the construction of the various parts. Herein, the calibration element comprises a resistor 56 preferably located adjacent one output terminal 52 where the currents are low so that the contact resistance between the resistor and its slider 57 may vary without introducing error voltages into the system.

In accordance with another aspect of the invention, the elements providing the voltage for the sensing unit 11 are arranged in the two sections 50 and 51 thereof in a novel manner with respect to the calibration element 55 to enable the latter to be located adjacent one output terminal 52 and also to reduce the cost and simplify the construction of the unit. To these ends, the voltage is derived from separate transformer secondary windings 58 and 59 connected individually in the different network sections and in series with the respective end portions of the calibration resistor 56 and with the respective sensing and balancing impedance elements 12 and 54. These secondary windings are wound on the same core 60 of a transformer 61 having a primary winding 62 energized from a suitable source 63. Being wound on a common core and preferably on the same section thereof, the windings are subject to the same ambient temperature. In view of this and the low value of resistance in each secondary, changes in the calibration due to ambient temperature changes of the secondaries are reduced substantially to zero.

The temperature responsive element 12 in this instance is of the variable resistance type whose value varies with changes in the temperature. The balancing element 54 correspondingly is a resistor. To provide adjustment of the value of sensing element resistance at which the sensing network is balanced, the network also includes a control point adjusting potentiometer having a slider 64 connected to the output terminal 53 remote from the calibration element 55 and a resistor 65 connected in parallel with a fixed resistor 66 between the sensing and balancing resistors. The transformer secondary windings 58 and 59 are then connected between the latter resistors and the opposite ends of the calibration resistor to complete the two sections 50 and 51 of the network. When the power is available at the source 63 and the voltages induced in the secondary windings aid each other, the sensing unit provides between its output terminals an alternating current signal variable in phase and amplitude as the value of the sensing resistor 12 is adjusted above and below the value selected on the control point potentiometer 64, 65.

The output signal of the sensing unit 11 is utilized to obtain sequential operation of the controllers 13, 16 and 17, by applying the signal to the controller input circuits through the sequencing unit 15. For this purpose, the sensing unit is connected between ground and an input terminal 67 of the sequencing unit which, at three output terminals 68, 69, and 70 provides different signals variable with the sensing unit signal. These different signals are then applied individually to the controllers through separate connections 71, 72, and 73.

It will be seen that the input circuit of the first controller 13 extends from the grid 28 of the first tube 27 to ground through the sequencing unit 15 and then the sensing unit 11 and from ground to the cathode 29 through the throttling resistor 43. The latter thus is located in a portion of the input circuit which is individual to the controller and thereby is isolated from the input circuits of the other controllers 16 and 17. This location enables the throttling range of the first controller to be adjusted without disturbing the calibration of the system or the adjustments of the other controllers. While isolation of the throttling elements of each controller may be achieved by locating the elements in any part of the controller input circuit individual to that controller, for example, in the associated one of the connections 71, 72 and 73 with the sequencing unit, it is preferred to locate the elements between ground and the cathode 29 therby retaining the advantages of this location as set forth above.

To permit the desired isolation of the throttling elements while providing adjustment of the temperatures at which the different controllers 13, 16 and 17 respond, the sequencing unit 15 comprises a normally balanced network including a voltage divider with different points connected to the output terminals 68, 69 and 70 of the unit. Like the sensing network, the sequencing network includes an adjustable calibration resistor 74 having a slider 75 connected to the input terminal 67 and its end portions connected in series with different secondary windings 76 and 77 in different sections of the network. The two sections are completed by individual series resistors 78 of fixed value and variable resistors 79 and 80 of the voltage divider. The junction of the divider resistors is connected directly to the center output terminal 69 and the sliders 81 and 82 of the variable resistors are connected to the other output terminals 68 and 70. With the proper adjustment of the calibration slider 75, the voltage of the center output terminal with respect to ground is equal to the output voltage of the sensing unit 11, the voltages of the other output terminals varying with the adjustment of their sliders 81 and 82.

Figure 4:
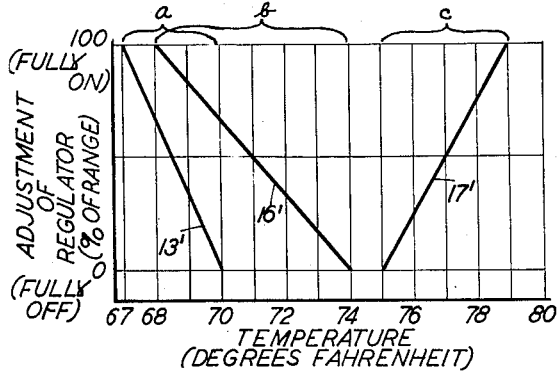
FIG. 4 is a chart illustrating different operating conditions of the system.

In the operation of the improved control system described thus far, let it be assumed that the calibration adjustments have been made and that the control point adjusting slider 64 in the sensing unit 11 and the sliders 81 and 82 in the sequencing unit 15 have been adjusted to obtain the desired sequencing of the controllers 13, 16 and 17 and their individual regulators. Such sequencing is illustrated in FIG. 4 in which curves 13', 16' and 17' represent respectively the amounts of adjustment of the regulators of the different controllers plotted against the temperature of the controlled space 10. Referring to this figure and assuming that the temperature is below 67 degrees, it will be apparent from the curves 13' and 16' that both the regulator 14 for the first controller unit 13 and the regulator for the second controller unit 16 are in their fully "on" conditions. With the second regulator supplying heat along with the first regulator 14, the maximum amount of heat is being delivered to the space to raise the temperature.

As the temperature of the controlled space 10 increases up to and beyond 67 degrees, the sensing and sequencing units 11 and 15 provide an alternating current signal in the input circuit of the first controller 13 exceeding the opposing feedback signal between ground and the slider 48 of the throttling element 43 so as to energize the corresponding one of the motor control relays 23 and 24 and complete one circuit for the motor 20. The motor thereby shifts the slider 40 of the throttling potentiometer 39 in the proper direction and amount to change the voltage across the throttling element 43 to restore the balance of opposing voltages in the input circuit. When this balance is restored, the output signal of the controller decreases and the motor is deenergized. As an incident to adjustment of the throttling potentiometer slider, the slider 22 of the regulator 14 also is adjusted to reduce the current flowing through the heater 19.

The throttling range of the first controller 13 and regulator 14 in this instance is three degrees as indicated at $a$ in FIG. 4. This means that the slider 22 of the regulator is moved from one end of the resistor to the other in response to a change of three degrees in the temperature of the controlled space 10. With the adjustment starting when the temperature reaches 67 degrees, it will have been completed when the temperature reaches 70 degrees, as shown by the curve 13'. For intervening temperatures, the amount of adjustment of the regulator is proportional to the temperature. The width of the throttling range $a$ is adjusted in this instance by varying the position of the slider 48 with respect to the throttling resistor 43. This resistor being isolated from both the sensing and sequencing units 11 and 15, such adjustment of the slider is effected without upsetting the calibration or adjustment of either of these units.

The temperature at the center of the throttling range $a$ of the first controller 13, herein 68.5 degrees, is determined by adjustment of the slider 81 of the associated divider resistor 79 in the sequencing unit 15 and also by the adjustment of the control point slider 64 in the sensing unit 11. The adjustment of the latter also determines the center of the throttling range $b$ of the second controller 16. With this center at 71 degrees and the range having a width of six degrees as shown by the curve 16', the second range extends from 68 to 74 degrees and has a two degree overlap with the range $a$ of the first unit 13. The difference between the temperatures, 68.5 degrees and 71 degrees at the centers of the throttling ranges $a$ and $b$, as determined by the adjustment of the divider resistor slider 81, is referred to as "spread." The isolation of the throttling elements of each controller from the sequencing elements and from the other throttling elements make possible the illustrated overlap of the two throttling ranges. Such isolation also enables adjustment of the spread between the ranges of the controllers to be effected without disturbing the calibration of the system or the adjustment of the different throttling elements.

The third controller 17 and its regulator are assumed to provide a cooling of the controlled space 10 and to have a throttling range $c$ of 4 degrees with its center at 77 degrees as shown on the curve 17' and as determined by setting the slider 82 of the second divider resistor 80. The spread between the second and third ranges is six degrees. This locates the start of the third throttling range $c$ at 75 degrees, that is, 1 degree above the second range $b$. Both regulators of the first and second controllers then are in their fully "off" conditions when the temperature reaches 75 degrees where the third regulator becomes operative. Above 75 degrees and below 79 degrees, the adjustment of the third regulator between its fully "on" and fully "off" condition varies proportionally with the temperature. Above 79 degrees, the third regulator remains in its fully "on" condition.

In control systems for conditioning the atmosphere within an enclosure, it often is desired to vary the adjustment of the condition regulators with changes in the temperature outside of as well as within the enclosure. Such changes are detected by a separate sensing element 83 which herein is a variable temperature sensitive resistor. To provide a signal which may be added to the signal of the inside sensing unit 11 in the input circuits of the controllers 13, 16 and 17, the outside element in this instance is connected in a normally balanced network 84 of an outside sensing unit 85. The network is energized through a transformer 86 and provides an alternating current output signal variable in phase and amplitude with changes in the value of the outside element.

The signal from the outside sensing unit 85 also is applied to the input of an amplifier-controller 87 associated with another space 88 whose temperature is being controlled. This space and the first space 10, for example, may be different rooms or groups of rooms in the same building. In the input circuit of the controller for the second space, the outside signal is added to that of a separate inside sensing unit 89 having a temperature sensing element 90 located in the second space. The combined inside and outside signals are utilized by the controller to adjust a suitable regulator (not shown) to correct for deviations of the temperature of the controlled space from a desired value.

In accordance with another aspect of the present invention, the outside sensing unit 85 is constructed in a novel manner and is connected to the controllers for the different spaces 10 and 88 so as to enable the same outside signal to be applied to more than one controller without upsetting the calibration or adjustment of the controllers or introducing error signals even though the controllers are separated by large distances requiring long lengths of connecting conductors. To this end, the outside unit comprises an impedance changing amplifier 91 which, across an output impedance element 92 of very low value on the order of just a few ohms, provides an alternating current signal of the same phase and amplitude as the signal from the balanced network 84 which is at a much higher impedance level. The low impedance output element then is connected directly between ground and conductors 93 which are connected to the various individual sensing units 11 and 89. By virtue of the low impedance of the output element, the impedance of the conductors 93 also is low so that any voltages resulting from currents induced in the conductors due to stray fields are of negligibly low value making it unnecessary to shield the conductors.

The amplifier 91 of the outside sensing unit 85 in this instance comprises two stages of zero phase shift with triodes 94 supplied from the output terminals of the balanced network 84. The signal then is fed first to a cathode follower 95 having paralleled triodes and finally is applied to the output impedance element 92 through a step down transformer 96. The output impedance element in this instance is a fixed resistor.

It will be apparent that the input circuit of each of the amplifier controllers 13, 16 and 17 includes at least two balanced networks whose individual signals are added together to provide the input signal for the controller. Herein, these networks are the bridge 84 of the common sensing unit 85 and bridge in the individual sensing unit 11. Due to various factors such as long lengths of conductors connecting the sensing elements 12 and 83 to the sensing units, stray reactances are present to introduce alternating current error signals into the units and thus into the amplifier input. In the case of the conductors, the reactance is capacitance resulting in an error signal approximately ninety degrees out of phase with the normal unbalance signal of the associated bridge. Such error signal, although small, is objectionable, one undesirable effect being saturation of the amplifier and a corresponding reduction of its gain.

The error signals due to stray reactance are rendered ineffective by resistance and reactance phase shift elements 97 and 98 which compensate for such error. To reduce the number of parts and the number of adjustments needed for this purpose, a single set of phase shift elements is arranged in the input circuit of each amplifier controller in a novel manner to compensate for the error signals. To enable a single set of elements to compensate for the error signals of a plurality of balanced networks as in this instance, the elements are connected into the amplifier input so that their compensating signal and the error signals are added algebraically.

In the present instance, the phase shifting elements 97 and 98 are a potentiometer having its resistance element 99 connected across the center tapped transformer secondary 37 (FIG. 2) and its slider 100 connected to the cathode 29 of the first amplifier tube 27 through a capacitor 98 which constitutes the other phase shift element. With the center tap of the transformer grounded and thus connected to the amplifier input circuit at the ground connection 42, adjustment of the slider in opposite directions from a central neutral position between the ends of the resistance will result in the application to the input circuit of an alternating current signal of adjustable amplitude and having one phase or the opposite phase each displaced approximately 90 degrees from the voltage of the secondary. By proper adjustment, this compensating voltage opposes and balances the error signals sufficiently that their undesirable effects are negligible, such adjustment being made at the time of calibration of the various units.

Figure 2:
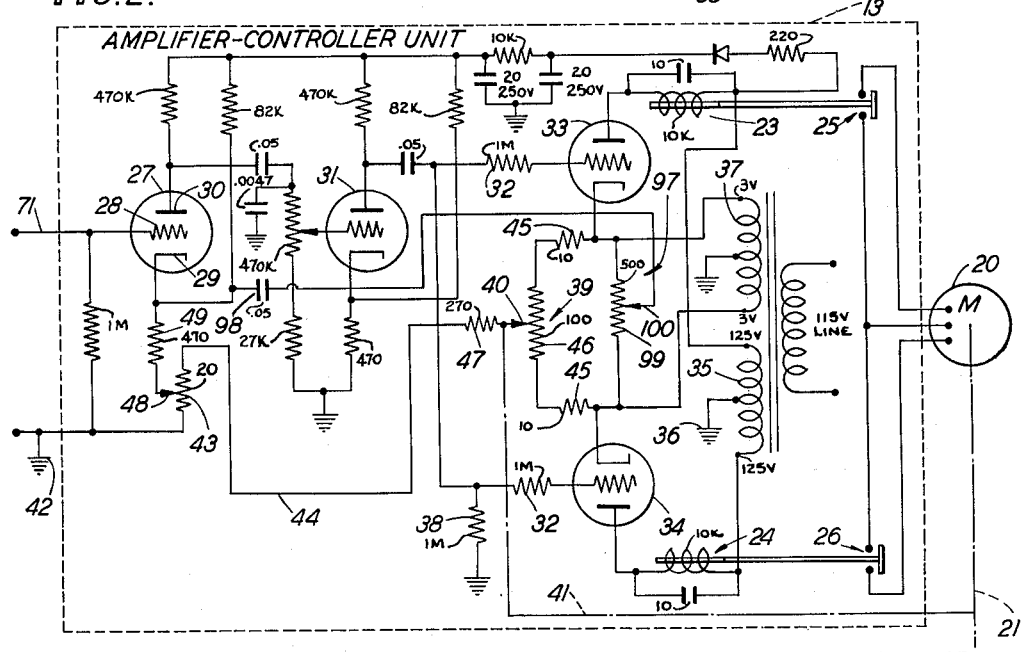
FIGS. 2 and 3 are schematic views and wiring diagrams showing different units of the system, the unit of FIG. 2 being an amplifier controller which provides a proportioning control action.
Figure 3:
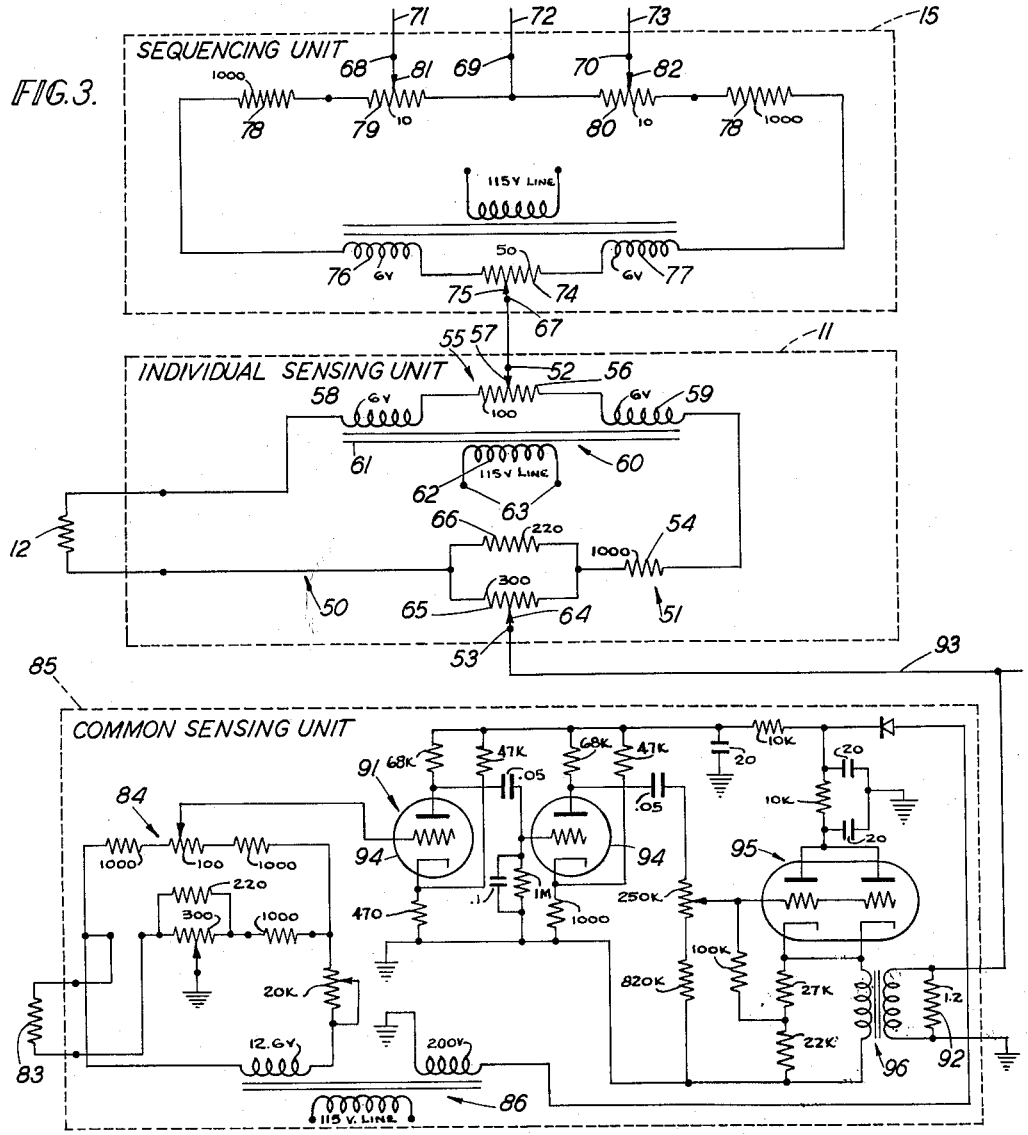

In one control system constructed as described above, the values of the various resistors and capacitors are the same as indicated by the numbers adjacent these parts in FIGS. 2 and 3, the numbers adjacent the resistors representitng ohms and those adjacent the capacitors representitng microfarads. The voltages across the various transformer windings and the impedances of the motor relays 23 and 24 also are indicated. In the controller 13 of FIG. 2, the first two triodes 27 and 31 are halves of a 12AX7 tube and the phase discriminator triodes 33 and 34 are halves of a 12AV7 tube. In the common sensing unit 85, all of the triodes are halves of a 12AU7 tube.

I claim as my invention:

1. In a system for controlling a variable condition, the combination of, a sequence unit comprising a voltage divider having two impedance elements connected by an intermediate tap and each having a different tap adjustable to vary the impedance between such tap and the intermediate tap, a calibration impedance element having an adjustable tap, and a transformer having two secondary windings of similar construction wound on a common core and respectively connected in series with said calibration element between opposite ends of this element and the ends of said voltage divider, a plurality of controller units each having first and second input terminals and an amplifying device with an input electrode connected to the first terminal of the unit and providing an output signal variable with changes in a signal applied between the input electrode and a common electrode, a sensing unit providing a signal variable with changes of said condition and connected between said tap of said calibration element and a common connection with said second input terminals of said controller units, individual connections between said divider taps and said first input terminals of said controller units, and at least one feedback means each connected and cooperating with a different one of said controller units, each of said feedback means connecting said common electrode to said second terminal of the associated controller unit and providing a signal opposing the input signal between the input terminals of the unit and varying proportionally with said output signal of the unit to balance the input signal.

2. In a system for controlling a variable condition, the combination of, a sensing unit providing a signal variable with changes of said condition, a plurality of controller units each having an amplifying device providing an output signal variable with changes in a signal applied to an input circuit extending between first and second electrodes of the device, a sequencing unit having a calibration impedance element with an input terminal adjustable tap connected through said sensing unit to said first electrodes of said amplifying devices, a voltage divider having a plurality of taps each connected individually to a different one of said second electrodes, and a transformer having two secondary windings wound on a common core and respectively connected in series with said calibration element between opposite ends of this element and opposite ends of said divider, and at least one feedback means each connected to and cooperating with a different one of said controller units, each of said feedback means providing a feedback signal proportional to the output signal of the associated controller unit and including an element connected to the portion of said input circuit of the unit extending between said second electrode of the unit and the associated output terminal of said sequencing unit and between said sensing unit and said first electrode of the controller unit whereby the feedback signal is applied to the circuit in opposition to the signal from the sequencing and sensing units without varying the adjustment of the sequencing units.

3. In a system for controlling a variable condition, the combination of, a sequence unit comprising a voltage divider having a plurality of taps, a calibration impedance element having an adjustable tap, and a transformer having two secondary windings of similar construction wound on a common core and respectively connected in series with said calibration element between opposite ends of this element and opposite ends of said voltage divider, a plurality of controller units each having first and second input terminals and an amplifying device with an input electrode connected to the first terminal of the unit and providing an output signal variable with changes in a signal applied between the input electrode and a common electrode, a sensing unit providing a signal variable with changes of said condition and connected between said tap of said calibration element and a common connection with said second input terminals of said controller units, individual connections between said divider taps and said first input terminals of said controller units, and at least one feedback means each connected to and cooperating with a different one of said controller units, each of said feedback means connecting said common electrode to said second terminal of the associated controller unit and providing a signal opposing the input signal between the input terminals of the unit and varying proportionally with said output signal of the unit to balance the input signal.

4. In a system for controlling a variable condition, the combination of, a plurality of controller units each having first and second input terminals and an amplifying device with an input electrode connected to the first terminal of the unit and providing an output signal variable with changes in signal applied between the input electrode and a common electrode, a sensing unit providing a signal variable with changes of said condition, a common connection between said second input terminals of said controller units, a sequencing unit having an input terminal connected to said common connection through said sensing unit and a plurality of output taps each connected individually to a different one of said first input terminals of said controller units, and at least one feedback means each connected to and cooperating with a different one of said controller units, each of said feedback means connecting said common electrode to said second terminal of the associated controller unit and providing a signal opposing the input signal between the input terminals of the unit and varying proportionally with said output signal of the unit to balance the input signal.

5. In a system for controlling a variable condition, the combination of, a sensing unit providing a signal variable with changes of said condition, a plurality of controller units each having an amplifying device providing an output signal variable with changes in a signal applied to an input circuit extending between first and second electrodes of the device, a sequencing unit having an input terminal connected through said sensing unit to the first electrode of each of said amplifying devices and a plurality of output terminals each connected individually to a different one of said second electrodes, said sequencing and sensing units applying to said input circuits through said different output terminals different signals variable with said sensing unit signal, and at least one feedback means each connected to and cooperating with a different one of said controller units, each of said feedback means providing a feedback signal proportional to the output signal of the associated controller unit and including an element connected to the portion of said input circuit of the unit extending between said second electrode of the unit and the associated output terminal of said sequencing unit and between said sensing unit and said first electrode of the controller unit whereby the feedback signal is applied to the circuit in opposition to the signal from the sequencing and sensing units without varying the adjustment of the sequencing unit.

6. In a system for controlling a variable condition, the combination of, a controller unit having an amplifying device providing an output signal variable with changes in an input signal applied between input and common electrodes of the device, a sensing unit connected between said input electrode and ground and providing a signal variable with changes of said condition, a normally balanced throttling network including a resistance element of low value on the order of a few ohms connected between said common electrode and ground, said element being adjustable in resistance to adjust the amplitude of the throttling range and a throttling potentiometer located remotely from and connected conductively to said resistance element, said potentiometer having a slider adjustable to produce a balancing voltage applied to said resistance element in series opposition to said sensing unit signal, a reversible power operator connected to said slider and means responsive to reversals in phase of said output signal following changes in the sensing unit signal for energizing said operator to adjust the slider to produce corresponding changes of said balancing voltage.

7. In a system for controlling a variable condition, the combination of, a controller unit having an amplifying device providing an output signal variable with changes in an input signal applied between input and common electrodes of the device, a sensing unit connected between said input electrode and ground and providing a signal variable with changes of said condition, a normally balanced throttling network including a resistance element connected between said common electrode and ground, said element being adjustable in resistance to adjust the amplitude of the throttling range and a throttling potentiometer having a slider adjustable to produce a balancing voltage across the resistance element in series opposition to said sensing unit signal, a reversible power operator connected to said slider and means responsive to reversals in phase of said output signal following changes in the sensing unit signal for energizing said operator to adjust the slider to produce corresponding changes of said balancing voltage.

References Cited in the file of this patent

UNITED STATES PATENTS

| | | |
|---|---|---|
| 2,196,687 | Steinfeld | Apr. 9, 1940 |
| 2,207,941 | Otto | July 16, 1940 |
| 2,209,369 | Wills | July 30, 1940 |
| 2,316,008 | Ludbrook | Apr. 6, 1943 |
| 2,426,711 | Shaffer | Sept. 2, 1947 |

(Other references on following page)

UNITED STATES PATENTS

| | | |
|---|---|---|
| 2,518,996 | Peckham | Aug. 15, 1950 |
| 2,664,244 | Miller | Dec. 29, 1953 |
| 2,692,969 | Baring | Oct. 26, 1954 |
| 2,703,379 | Malick | Mar. 1, 1955 |
| 2,751,169 | Kutzler | June 19, 1956 |
| 2,788,941 | Crysler et al. | Apr. 16, 1957 |
| 2,813,235 | Clay | Nov. 12, 1957 |
| 2,835,749 | McCormack | May 20, 1958 |
| 2,855,551 | McCarty | Oct. 7, 1958 |

OTHER REFERENCES

Engineering Manual of Automatic Control (77–1000), copyright 1957 by Minneapolis-Honeywell Regulator Company, pp. 1–B1 through 1–B12 (only pp. 1–B11 and 1–B12 needed) TH 7687M5.

Industrial Heating Engineer for March 1958, pp. 67 through 73, TH 7201 I54.